United States Patent [19]
Byon

[11] Patent Number: 5,658,011
[45] Date of Patent: Aug. 19, 1997

[54] AIR BAG APPARATUS OF A TIRE'S AIR PRESSURE SENSING SYSTEM FOR A VEHICLE

[75] Inventor: Sung-Kwang Byon, Seoul, Rep. of Korea

[73] Assignee: Daewoo Electronics Co., Ltd., Seoul, Rep. of Korea

[21] Appl. No.: 579,017

[22] Filed: Dec. 27, 1995

[30] Foreign Application Priority Data

Feb. 9, 1995 [KR] Rep. of Korea ................. 95-2321

[51] Int. Cl.⁶ .................................................. B60R 21/32
[52] U.S. Cl. ...................... 280/735; 180/274; 340/442
[58] Field of Search ............................ 280/734, 735; 180/274, 282; 340/438, 442, 460

[56] References Cited

U.S. PATENT DOCUMENTS

5,289,160  2/1994  Fiorletta ..................... 340/442
5,581,464  12/1996  Woll et al. .................. 340/459

Primary Examiner—Paul N. Dickson
Attorney, Agent, or Firm—Beveride, DeGrandi, Weilacher & Young LLP

[57] ABSTRACT

An air bag apparatus in a tire air pressure sensing system for a vehicle capable of reliably protecting passengers of the vehicle from accidents regardless of the pattern of the accident which includes a collision sensing section, a pressure sensing section, a receiving section, an Electronic Control Unit, a warning section and an air bag actuating section. The collision sensing sections has first and second collision sensors, and pressure sensing section has pressure sensors and radio transmitters. The warning section has sound and visual warning units, and air bag actuating section has an inflatable air bag and an inflator. Here, the air bag is operated when the first collision sensors monitor the shock at least a first shock value, or the second collision sensors monitor the shock at least the second shock value while the pressure sensors monitor a pressure below a pressure value presented by a no-load state of an air pressure in the tire.

20 Claims, 4 Drawing Sheets

AIR BAG APPARATUS OF A TIRE'S AIR PRESSURE SENSING SYSTEM FOR A VEHICLE

BACKGROUND OF THE INVENTION

1. Field of the Invention

The present invention relates to an air bag apparatus for a vehicle, and more particularly to an air bag apparatus for a vehicle of a system that senses the air pressure of a tire to determine whether an air bag is operated or not for reliably operating the air bag with respect to accidents of different patterns such as collisions, overturning and headlong falls of vehicles.

2. Description of the Prior Art

Generally, vehicles employ an air bag apparatus for protecting passengers from a shock applied during a car crash. Such an air bag apparatus includes an inflatable air bag, a collision sensor for sensing the collision of the vehicle to generate a collision sensing signal, and an Electronic Control Unit (hereinafter referred to as "ECU") for comparing to analyze the collision sensing signal from the collision sensor to control an operation of the air bag. In addition, the air bag apparatus includes an inflator for injecting a gas or air to the inflatable air bag in accordance with an air bag expansion triggering signal from the ECU for expanding the air bag.

Figure 4:
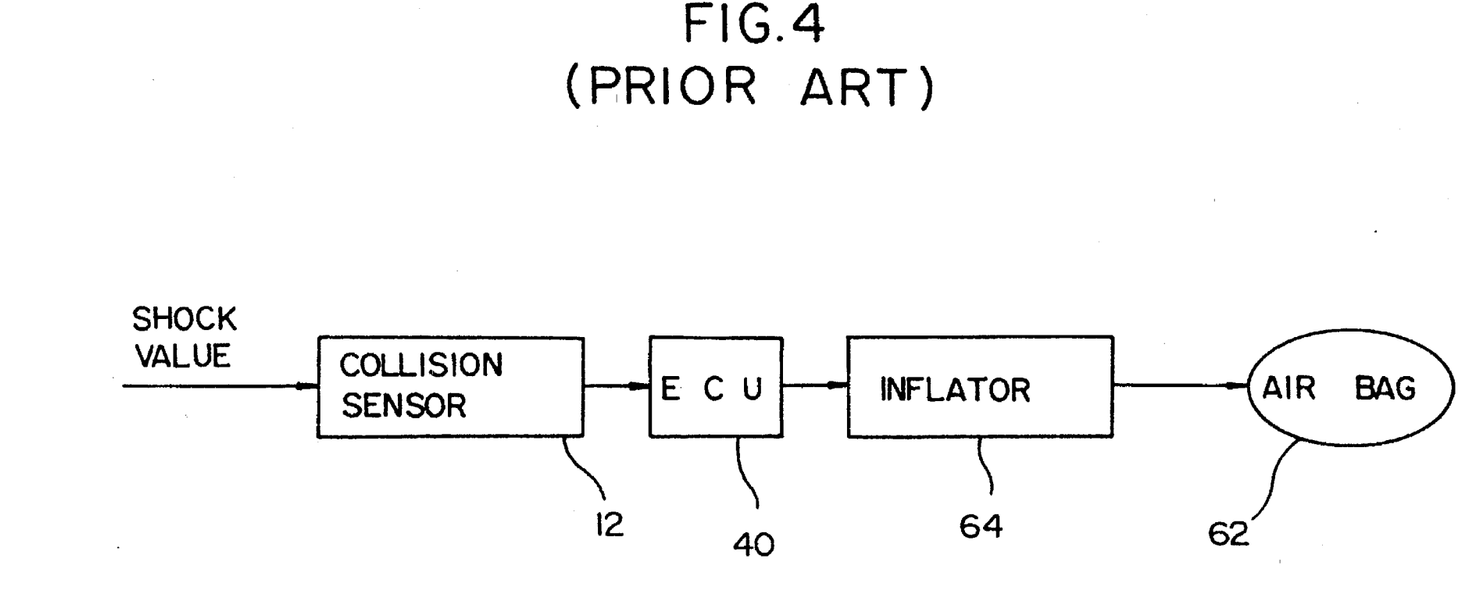
FIG. 4 is a block diagram schematically showing a construction of a conventional air bag apparatus.

An operation of the conventional air bag apparatus constructed as above will be considered with reference to FIG. 4. First, if a shock is applied to the car body by a collision with another vehicle while running along a road, the collision of the vehicle is monitored by a collision sensor 12 mounted to the forefront of the vehicle. Collision sensor 12 generates a collision sensing signal when the shock against the car body exceeds a preset shock value required for inflating an air bag 62 to supply it to ECU 40 which determines whether the collision sensing signal is received from collision sensor 12 to provide the air bag expansion triggering signal to inflator 64. Once the air bag expansion triggering signal is provided, inflator 64 injects an inert gas such as nitrogen $N_2$ or argon Ar, or air to inflatable air bag 62 to instantaneously expand air bag 62. Consequently, by the expansion of air bag 62, the passenger in the vehicle can be protected from colliding with a structural part of the vehicle.

Meanwhile, the collision sensor employed for the air bag apparatus has at least one acceleration sensor which measures acceleration/deceleration of the colliding vehicle. Typically, the collision sensor may include a load sensor, a seat belt sensor, and the like in addition to the acceleration sensor. The air bag apparatus for the vehicle having the collision sensor has been disclosed in a plurality of U.S. Patents.

For example, in U.S. Pat. No. 5,246,083 issued to Graf et al., an air bag apparatus is provided with an acceleration sensor for sensing the collision state of a vehicle to generate a collision sensing signal. Here, the acceleration sensor is connected to a pyrotechnic propellant charge for igniting the expansion of the air bag and mounted to the car body at the front of a driver's seat.

In U.S. Pat. No. 5,257,816 issued to Tomiji Sugimoto et al., an air bag apparatus includes acceleration sensors of different kinds which are closely disposed in a single place to constitute an air bag unit, and control the electric current supply to an inflator. The acceleration sensors monitor the colliding moment of the vehicle to generate a collision sensing signal as well as prevent the fault operation of the air bag.

U.S. Pat. No. 5,184,848 issued to Hideo Omura discloses an air bag apparatus provided with a vehicle speed sensor, a load sensor, a seat belt sensor and an atmospheric pressure sensor. Here, the vehicle speed sensor is mounted to a transmission of the vehicle for sensing the moment the car crashes, and the load sensor is to a rear side of a seat for sensing the passenger load to perceive whether the driver is separated from the seat or not. The seat belt sensor is mounted around a buckle of a seat belt for sensing the speed of the passenger colliding against the inflated air bag. The atmospheric pressure sensor is disposed around an air inlet aperture of an engine room hood for measuring the atmospheric pressure to assist an operation of a relief valve associated with a proper expansion force of the air bag.

However, in the conventional air bag apparatus provided with the above sensors, the acceleration sensor or vehicle speed sensor for directly sensing the car crash are only mounted to the forefront portion of the vehicle. Furthermore, the load sensor, seat belt sensor and atmospheric pressure sensor merely serve for assisting the operation of the acceleration sensor or vehicle speed sensor. Thus, if the vehicle is overturned or falls, the sensors fail to operate or normally operate the air bag, so that the passenger is not safely protected from accidents. For example, if the vehicle is partially or completely overturned by as much as 90° to 180° while along on a road, the vehicle temporarily runs along the road surface due to inertia force under the state of being overturned prior to stopping. At this time, the intensity of the shock applied to the vehicle resulting from the overturn is smaller than the shock generally required for operating the air bag, so that the air bag may not be operated.

In addition, the conventional air bag apparatus lacks of a system for previously warning several dangerous circumstances to a driver while driving the vehicle before the occurrence of the accident to obviate disasters such as a collisions, overturning or headlong falls in advance.

SUMMARY OF THE INVENTION

The present invention is devised to solve the foregoing problems. It is an object of the present invention to provide an air bag apparatus for a vehicle capable of safely protecting a passenger in the vehicle from accidents such as an overturning or headlong falls of the vehicle in addition to crashes.

It is another object of the present invention to provide an air bag apparatus for a vehicle capable of operating reliably while involving a function of preventing accidents by accurately determining the travelling state of the vehicle to inform the driver about abnormal conditions in advance.

To achieve the foregoing objects, the present invention provides an air bag apparatus of a tire's air pressure sensing system for a vehicle comprising:

a collision sensing section for generating a first collision sensing signal when a shock applied to a front, rear, right side and left side portions of the vehicle exceeds a first shock value, and for generating a second collision sensing signal when a shock applied to the right side, left side and upper portions of the vehicle exceeds a second shock value;

a pressure sensing section for generating a pressure sensing signal when the tire's air pressure of the vehicle is below a pressure value presented by a no-load state of an air pressure in the tire;

an electronic control unit for generating an air bag expansion triggering signal when receiving the first collision sensing signal, for generating the air bag expansion triggering signal when receiving both the second sensing signal and the pressure sensing signal, and for generating a warning operation start signal when receiving either the second collision sensing signal or the pressure sensing signal;

a warning section for alerting in accordance with the warning operation start signal from said electronic control unit; and an air bag actuating section for expanding an air bag of the vehicle in accordance with the air bag expansion triggering signal from said electronic control unit.

Preferably, the air bag apparatus further comprises a receiving section for receiving the pressure sensing signal transmitted to transmit the received signal as a radio signal to the Electronic Control Unit.

The first shock value is greater than the second shock value. The first shock value has the minimum value required for inflating the air bag to protect passengers of the vehicle from a predetermined shock applied to the vehicle. The second shock value has the minimum value required for inflating the air bag to protect the passengers of the vehicle from the shock lower than the first shock value applied to the right and left side portions and upper portion of the vehicle. The collision sensing section comprises first collision sensors for generating the first collision sensing signal, and second collision sensors for generating the second collision sensing signal. The pressure sensing section comprises pressure sensors for monitoring the air pressure of the tire and radio transmitter means for amplifying the pressure sensing signal monitored by the pressure sensors to transmit the result as the radio signal. The warning section comprises sound warning means and visual warning means. The warning section warns via sound and visible characters. Preferably, the sound warning means is a speaker or a klaxon. The visual warning means is a display. The air bag actuating section comprises the air bag and an inflator for injecting an inflation gas into the air bag to inflate the air bag when receiving the air bag expansion triggering signal from the Electronic Control Unit.

In the air bag apparatus according to the present invention, first collision sensors for generating a first collision sensing signal in response to a shock applied during the collision of the vehicle is mounted to the front portion, rear portion, right and left side portions of a car body. Also, second collision sensors are mounted to the upper portion and right and left side portions of the car body for generating a second collision sensing signal in respond to the shock valve lower than the shock value which the first collision sensors respond. Then, a pressure sensing section for sensing an air pressure of respective tires of the vehicle to amplify and output the result as a radio signal is mounted around an aperture for injecting air to the tires. Thus, a passenger of the vehicle can be prevented from physically colliding with a structure part of the vehicle in the event of an overturn or headlong fall as well as a car crash. Furthermore, a warning section is employed to warn of impending danger or puncture of the tires via sound and visible characters to permit a driver to take appropriate measures, thereby preventing an accident in advance. Briefly, the collision sensors responsive to respectively different amount of shock, pressure sensors and warning section are employed to accurately control the operation of the air bag in the optimum state regardless of the pattern of accidents.

BRIEF DESCRIPTION OF THE DRAWINGS

The above objects and other advantages of the present invention will become more apparent by describing in detail the preferred embodiments thereof with reference to the attached drawings, in which.

DESCRIPTION OF THE PREFERRED EMBODIMENT

Hereinafter, the present invention will be described in detail with reference to the accompanying drawings.

Figure 1:
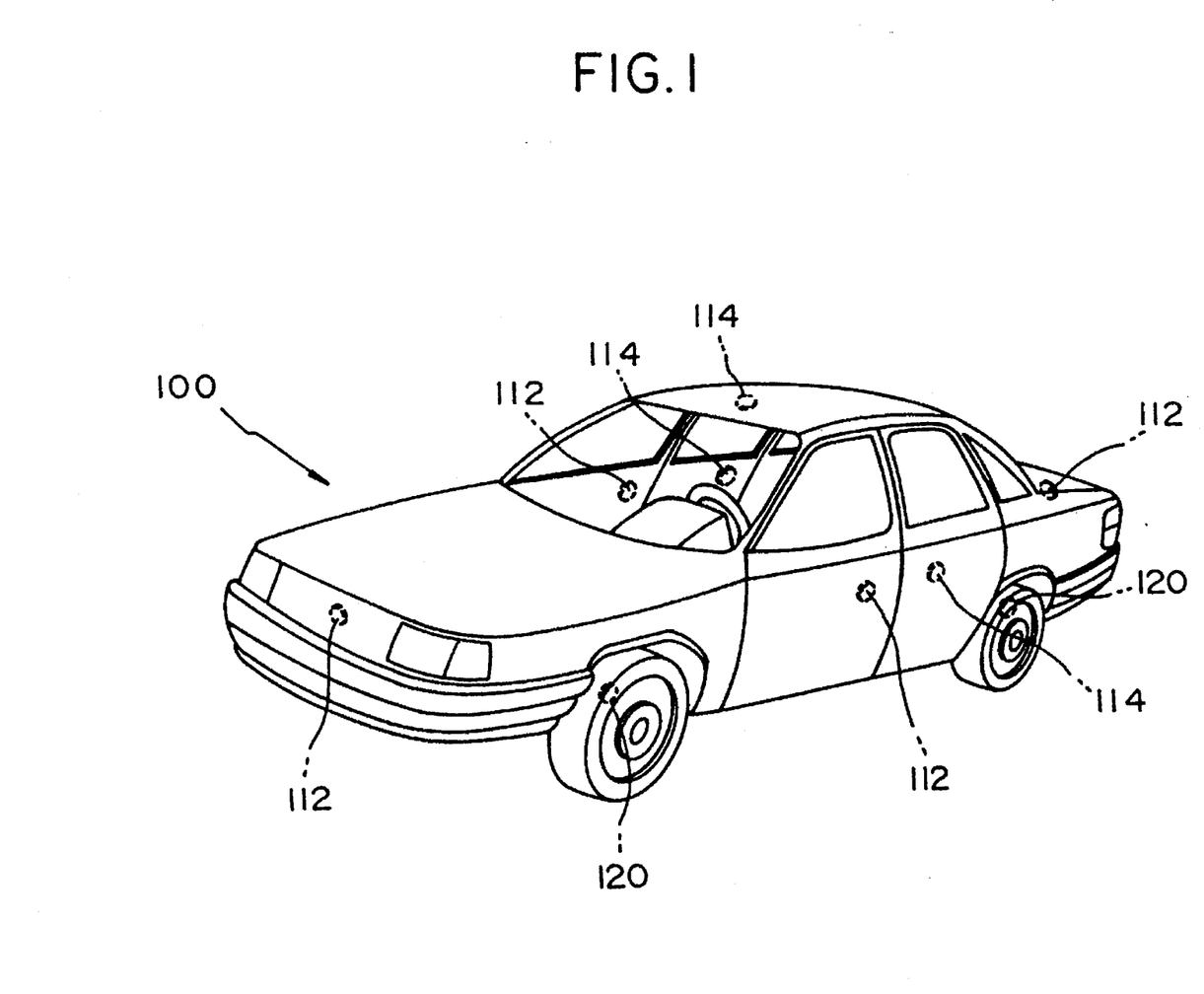
FIG. 1 is a diagrammatic perspective view of a motor vehicle showing mounting places of the collision and pressure sensors according to one preferred embodiment of the present invention.

FIG. 1 is a view schematically showing mounting positions of the collision and pressure sensors according to one preferred embodiment of the present invention. First collision sensors 112 are mounted to the front portion, right and left side portions and rear portion of a vehicle 100. First collision sensors 112 generate a first collision sensing signal under the state that, when vehicle 100 collides with another vehicle or a certain object while running on the road, or when vehicle 100 collides with a certain object due to headlong fall of the vehicles, an amount of shock applied to a car body exceeds a first shock value (a preset shock value of triggering air bag expansion). Second collision sensors 114 are mounted to the upper portion, right and left side portions of vehicle 100. Second collision sensors 114 generate a second collision sensing signal when the amount of shock applied to the upper surface portion, right and left sides of the car body exceeds a second shock value (a preset shock value of triggering air bag expansion) smaller than the first shock value.

Figure 2:
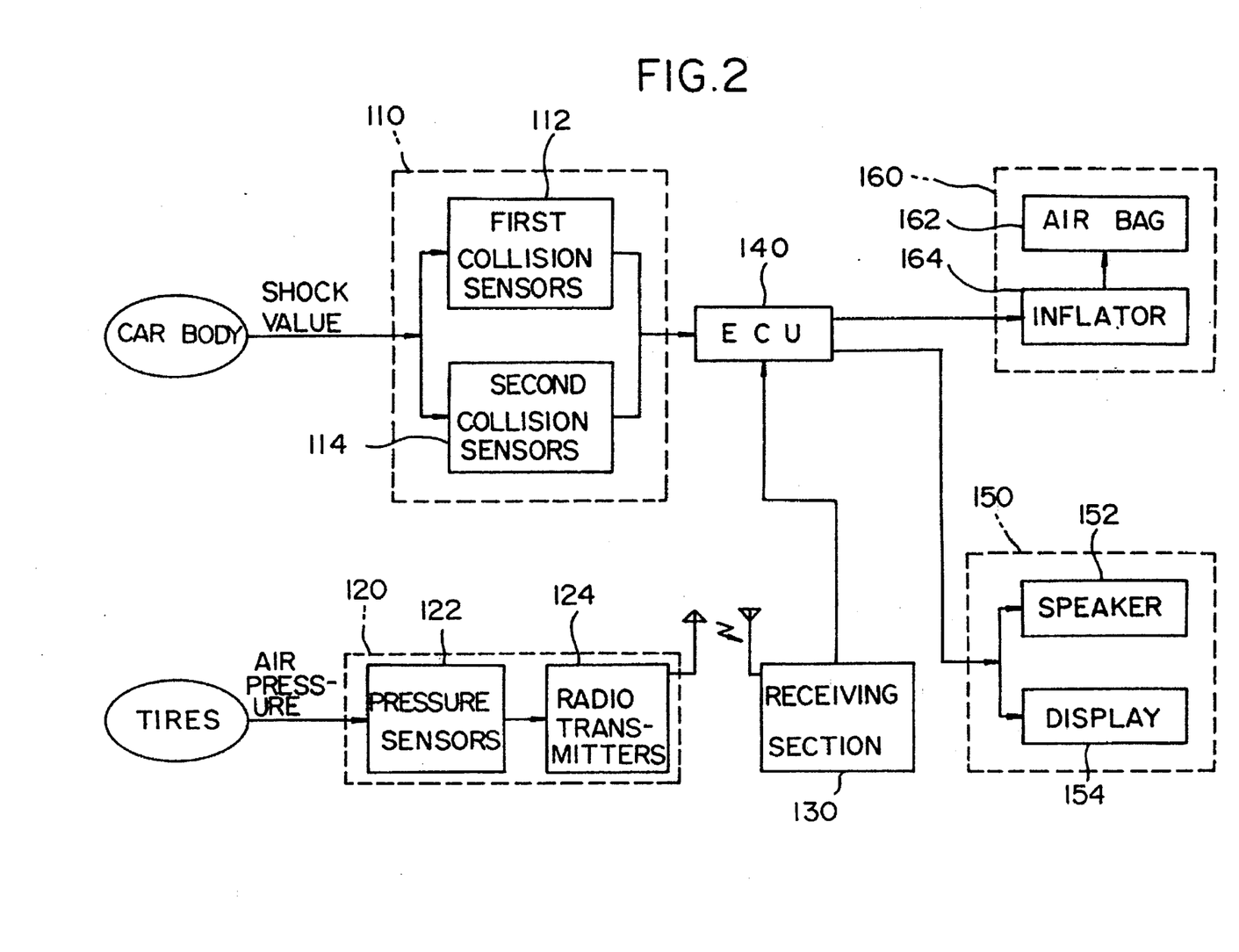
FIG. 2 is a block diagram schematically showing an air bag apparatus mounted to the motor vehicle shown in FIG. 1.

A pressure sensing section 120 is mounted to respective tires of vehicle 100, which includes unshown pressure sensors and unshown radio transmitters (122 and 124 in FIG. 2). Preferably, pressure sensing section 120 is mounted around an aperture for injecting air into the tire. Pressure sensors 122 generate a pressure sensing signal when vehicle 100 goes to a 'no-load state' or the air pressure of the tire goes to the atmospheric pressure state due to the tire's flat. Here, the 'no-load state' denotes a state that the tire is not applied with the load since vehicle 100 is temporarily lifted from the surface of the ground while travelling on a road to upwardly float, overturn or fall headlong.

FIG. 2 is a block diagram schematically showing a construction of an air bag apparatus according to the present invention. The air bag apparatus according to the present invention largely includes a collision sensing section 110, pressure sensing section 120, a receiving section 130, an ECU 140, a warning section 150 and an air bag actuating section 160. Collision sensing section 110 has first collision sensors 112 and second collision sensors 114. First collision sensors 112 are mounted to the front portion, rear portion and right and left side portions of vehicle 100 (refer to FIG. 1). Second collision sensors 114 are mounted to the upper portion, right and left side portions of vehicle 100. Pressure sensing section 120 which is mounted around the aperture for injecting the air to the tire as mentioned above has pressure sensors 122 and radio transmitters 124 which amplify the pressure sensing signal from pressure sensors 122 to transmit the result. Receiving section 130 receives and amplifies a radio signal transmitted from radio transmitters 124 to provide the result to ECU 140 which compares, analyzes and determines the sensing signals from first collision sensors 112, second collision sensors 114 and receiving section 130, thereby determining whether warning section 150 or air bag actuating section 160 is operated. Warning section 150 includes a speaker 152 which is an sound alert unit and a display 154 which is a visual alert means. Preferably, a klaxon may be employed as the sound warning means. Warning section 150 alerts abnormal air pressure of the tire and an impending danger to a driver of vehicle 100 through sound and visual characters when a warning operation start signal is supplied from ECU 140. Air bag actuating section 160 includes an air bag 162 and an inflator 164. Air bag 162 formed of a flexible fabric material is inflatable. Inflator 164 injects an inert gas such as $N_2$ or Ar, or air to air bag 162 when an air bag expansion triggering signal is supplied from ECU 140.

Hereinbelow, an operation of the air bag apparatus constructed as above according to the preferred embodiment of the present invention will be described.

Figure 3:
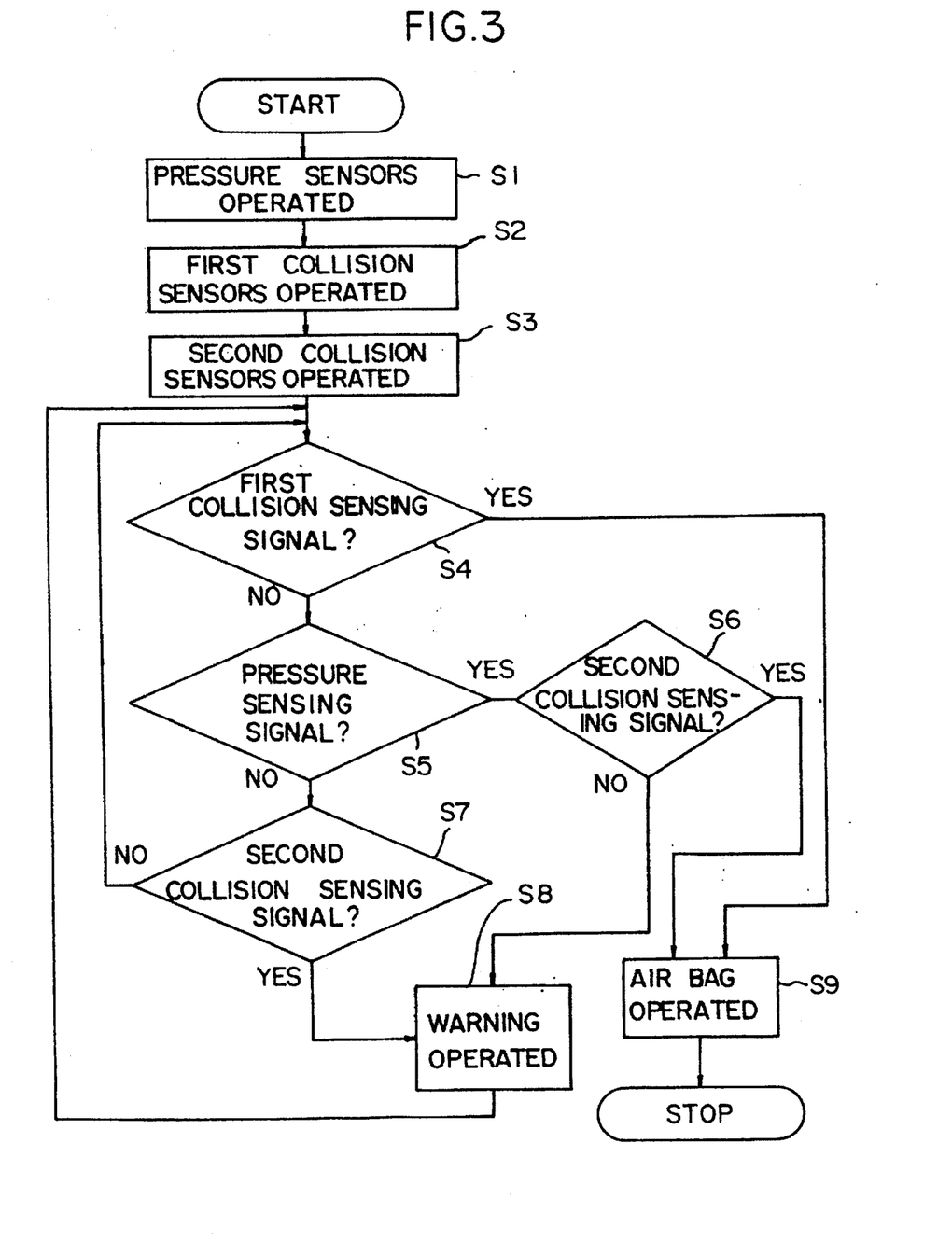
FIG. 3 is a flow chart for showing an operation of the air bag apparatus shown in FIG. 2.

FIG. 3 is a flow chart showing an operational principle of the air bag apparatus according to the present invention. Here, S1 is a step of operating pressure sensors 122 normally operated after starting vehicle 100, and S2 is a step of operating first collision sensors 112. S3 is a step of operating second collision sensors 114, and S4 is a step of checking the generation of the first collision sensing signal by ECU 140 to determine whether air bag actuating section 160 is operated or not. S5 is a step of checking the generation of the pressure sensing signal by ECU 140. S6 is a step of checking the generation of the second collision sensing signal by ECU 140 to determine whether warning section 150 or air bag actuating section 160 is operated under the state that the pressure sensing signal is generated. S7 is a step of checking the generation of the second collision sensing signal by ECU 140 to determine whether warning section 150 is operated or not under the state that the pressure sensing signal is not provided. S8 is a step of providing either one of the pressure sensing signal and second collision sensing signal to ECU 140, so that ECU 140 supplies the warning operation start signal to warning section 150 for operating warning section 150. S9 is a step of inflating air bag 162 by inflator 164 in accordance with the air bag expansion triggering signal supplied from ECU 140 to air bag actuating section 160 when the shock exceeding the first shock value is applied to vehicle 100 or the shock exceeding the second shock value is applied to vehicle 100 under the state that the pressure sensing signal is generated.

The above-mentioned operating steps will be described in detail in connection with the accident pattern of the vehicle.

Generally, once vehicle 100 starts travelling, pressure sensors 122 are normally operated to monitor the air pressure of the tire (step S1). Pressure sensors 122 produce the pressure sensing signal when vehicle 100 is on the no-load state or the air pressure of the tire is on the atmospheric pressure state as described above. There are several cases of generating the pressure sensing signal by pressure sensors 122, which will be described. First, if vehicle 100 is partially or thoroughly overturned by as many as 90° to 180° while running on the road, vehicle 100 temporarily slides along the road due to the inert by being overturned prior to being stopped. At this time, pressure sensors 122 generate the pressure sensing signal by recognizing that the tires of vehicle 100 are on the no-load state. Second, vehicle 100 is temporarily lifted above the surface of the ground when going over a hill to run along an uneven downward path. In this case, the tires of the vehicle are also on the no-load state, so that pressures sensors 122 produce the pressure sensing signal. Third, when vehicle 100 falls down from a hill while running on the road without having guard rails against falling, vehicle 100 floats in the air until reaching the ground to force the tires to be on the no-load state. Consequently, pressure sensors 122 are operated to generate the pressure sensing signal. Fourth, if the tire goes flat while vehicle 100 is stopped or travels along the road, the air pressure of the tire becomes the atmospheric pressure. At this time, pressure sensors 122 mounted to the flat tire monitors the atmospheric pressure state of the tire to generate the pressure sensing signal.

As described above, when pressure sensors 122 produce the pressure sensing signal, the generated pressure signal is provided to radio transmitters 124 which amplify the pressure sensing signal from pressure sensors 122 to transmit the amplified signal as a radio signal. Receiving section 130 receives the radio signal from radio transmitters 124 to amplify the received signal. The amplified radio signal is supplied to ECU 140.

On the other hand, once vehicle 100 is starts travelling, first collision sensors 112 are normally operated like pressure sensors 122 (step S2). First collision sensors 112 generate the first collision sensing signal when the shock exceeding the preset first shock value is applied to vehicle 100 as described above. For example, if vehicle 100 collides with another vehicle or an object face to face or side to side at high speed while running along the road to be applied with the shock exceeding the first shock value, first collision sensors 112 monitor the collision to generate the first collision sensing signal to ECU 140. Also, when vehicle 100 falls down from a hill while running on the road without having guard rails against falling to collide with an object down from the hill to be applied with the shock exceeding the first shock value to the car body, first collision sensors 112 monitor the collision to generate the first collision sensing signal. The first collision sensing signal from first collision sensors 112 is provided to ECU 140.

Meantime, once vehicle 100 starts travelling, second collision sensors 114 are normally operated like first collision sensors 112 (step S3). Second collision sensors 114 generate the second collision sensing signal when the shock exceeding the preset second shock value which is smaller than the first shock value is applied to the upper portion or sides of vehicle 100. For example, if vehicle 100 is partially or thoroughly overturned by as many as 90° to 180° while travelling along the road as described above, vehicle 100 temporarily slides along the surface of the road due to the inert under the state of being overturned, and then stopped. At this time, the shock applied to the upper portion or sides of vehicle 100 caused by the overturn is generally smaller than the aforesaid first shock value. Therefore, the second collision sensing signal is generated from second collision sensors 114 according to the present invention. The second collision sensing signal from second collision sensors 114 is supplied to ECU 140. Furthermore, if vehicle 100 falls down from a hill while running on the road without having the guard rails against falling to collide with an object down from the hill to be applied with the shock exceeding the second shock value to the upper portion or sides of the car body, second collision sensors 114 monitor the collision to transmit the second collision sensing signal. The second collision sensing signal from second collision sensors 114 is provided to ECU 140.

When the respectively different sensing signals are produced from pressure sensors 122, first collision sensors 112 and second collision sensors 114, ECU 140 receives the sensing signals to determine the most preferable operation. A function of ECU 140 according to the present invention will be described below.

ECU 140 checks whether the first collision sensing signal is produced from first collision sensors 112 to ECU 140 or not when the shock exceeding the first shock value is applied to vehicle 100 (step S4). When the first collision sensing signal is provided to ECU 140, ECU 140 supplies the air bag expansion triggering signal to air bag actuating section 160. However, if the first collision sensing signal is not supplied to ECU 140, ECU 140 checks whether the pressure sensing signal is produced from pressure sensors 122 to ECU 140 or not (step S5).

When the pressure sensing signal is supplied from pressure sensors 122 to ECU 140 in step S5, ECU 140 checks whether the second collision sensing signal is produced from second collision sensors 124 to ECU 140 or not (step S6). If the second collision sensing signal is supplied to ECU 140, ECU 140 provides the air bag expansion triggering signal to air bag actuating section 160. Unless the second collision sensing signal is supplied to ECU 140, ECU 140 provides the warning operation start signal to warning section 150.

If the pressure sensing signal is not provided from pressure sensors 122 to ECU 140 in step S5, ECU 140 checks whether the second collision sensing signal is produced from second collision sensors 124 to ECU 140 or not (step S7). When the second collision sensing signal is provided to ECU 140, ECU 140 supplies the warning operation start signal to warning section 150. However, unless the second collision sensing signal is provided to ECU, ECU 140 returns to the initial state.

If ECU 140 receives the sensing signal from either one of pressure sensors 122 and second collision sensors 114, the air bag expansion triggering signal is not supplied but the warning operation start signal is supplied to warning section 150. For example, vehicle 100 is temporarily lifted above the surface of the ground when going over the hill to run along the uneven downward path. In this case, the tires of the vehicle is on the no-load state, so that pressures sensors 122 produce the pressure sensing signal to supply it to ECU 140. After this, the shock applied to the car body when the temporarily-lifting vehicle becomes put on the surface of the road is monitored by the collision sensors. In this case, since the shock applied to the car body is usually not greater than the first shock value, the first collision sensing signal is not generated from first collision sensors 112. Further, the shock exceeding the second shock value is not directly applied to the side or upper portion of vehicle 100, so that the second collision sensing signal is not produced from second collision sensors 124. Therefore, ECU 140 does not generate the air bag expansion triggering signal but supplies the warning operation start signal to warning section 150 (refer to step S6).

In addition, if a shock in the extent of forcing second collision sensors 124 to generate the second collision sensing signal is applied to the car body without being facing with the foregoing no-load state or the atmospheric pressure state while vehicle 100 runs along the road, ECU 140 does not provides the air bag expansion triggering signal, but supplies the warning operation start signal to warning section 150 (refer to step S7).

As described above, when either one of the pressure sensing signal and second collision sensing signal is generated, ECU 140 does not provide the air bag expansion triggering signal, but supplies the warning operation start signal to warning section 150.

As described above, when the warning operation start signal is supplied from ECU 140 to warning section 150, speaker 152 as the sound alert unit and display 154 as the visual alert unit are operated to warn the state of the vehicle to the driver (step S8). After alerting the danger by means of warning section 150, the process returns to step S4.

On the other hand, if ECU 140 supplies the air bag expansion triggering signal to air bag actuating section 160 by the apply of the shock exceeding the first shock value upon vehicle 100, or if ECU 140 supplies the air bag expansion triggering signal to air bag actuating section 160 by the apply of the shock exceeding the second shock value upon vehicle 100 under the state that the pressure sensing signal is generated, inflator 164 injects the inert gas such as $N_2$ or Ar, or air to air bag 162 to instantaneously inflate air bag 162. By this operation, passengers in vehicle 100 can be safely protected from the danger resulting from the accident. After expanding air bag 162, the process is finished.

As described above, the present invention employs the first collision sensors and second collision sensors for generating different collision sensing signals in response to respectively different amount of shock, and the pressure sensors for monitoring the change of the air pressure in the tires in case of the overturn or headlong fall of the vehicle to generate the pressure sensing signal. Thus, the air bag is reliably operated regardless of the pattern of the car accidents to safely guard the passengers of the vehicle from the danger of the accident. Furthermore, the warning section for alerting the impending danger of a probable accident and abnormal state of the tires via sound and visible characters is employed to allow the driver to meet the emergency of the vehicle, thereby preventing the car accident in advance.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An air bag apparatus in a tire air pressure sensing system for a vehicle, said air bag apparatus comprising:

a collision sensing section for generating a first collision sensing signal when a shock applied to at least one of a front, rear, right side and left side portion of the vehicle exceeds a first shock value, and for generating a second collision sensing signal when a shock applied to at least one of the right side, left side and upper portion of the vehicle exceeds a second shock value;

a pressure sensing section for generating a pressure sensing signal when the air pressure of a vehicle tire is below a predetermined value;

an electronic control unit for generating an air bag expansion triggering signal when receiving the first collision sensing signal, for generating the air bag expansion triggering signal when receiving both the second collision sensing signal and the pressure sensing signal, and for generating a warning operation start signal when receiving either the second collision sensing signal or the pressure sensing signal;

a warning section for alerting in accordance with the warning operation start signal from said electronic control unit; and an air bag actuating section for expanding an air bag of the vehicle in accordance with the air bag expansion triggering signal from said electronic control unit.

2. An air bag apparatus in a tire air pressure sensing system for a vehicle as claimed in claim 1, wherein said pressure sensing section transmits the pressure sensing signal as a radio signal, and said air bag apparatus further comprises a receiving section for receiving the pressure sensing signal to transmit the pressure sensing signal to said electronic control unit.

3. An air bag apparatus in a tire pressure sensing system for a vehicle as claimed in claim 1, wherein the first shock value is greater than the second shock value.

4. An air bag apparatus in a tire pressure sensing system for a vehicle as claimed in claim 1, wherein the first shock value has a minimum value required for inflating the air bag to protect passengers of the vehicle from a predetermined shock applied to the vehicle.

5. An air bag apparatus in a tire pressure sensing system for a vehicle as claimed in claim 1, wherein the second shock value has a minimum value required for inflating said air bag to protect the passengers of the vehicle from the shock lower than the first shock value.

6. An air bag apparatus in a tire pressure sensing system for a vehicle as claimed in claim 1, Wherein said collision sensing section comprises first collision sensors for generating the first collision sensing signal, and second collision sensors for generating the second collision sensing signal.

7. An air bag apparatus in a tire pressure sensing system for a vehicle as claimed in claim 6, wherein said first collision sensors are mounted on at least one place among the front, rear, right side and left side portions of the vehicle.

8. An air bag apparatus in a tire pressure sensing system for a vehicle as claimed in claim 6, wherein said second collision sensors are mounted on the left side, right side and upper portions of the vehicle.

9. An air bag apparatus in a tire pressure sensing system for a vehicle as claimed in claim 1, wherein the predetermined value has a pressure value produced when the air pressure of the vehicle tire is on a no-load state.

10. An air bag apparatus in a tire pressure sensing system for a vehicle as claimed in claim 1, wherein said pressure sensing section comprises pressure sensors for monitoring the air pressure and radio transmitter means for amplifying the pressure sensing signal monitored by said pressure sensors to transmit the pressure sensing signal as a radio signal.

11. An air bag apparatus in a tire air pressure sensing system for a vehicle as claimed in claim 10, wherein said pressure sensing section is mounted at at least one tire of the vehicle.

12. An air bag apparatus in a tire air pressure sensing system for a vehicle as claimed in claim 11, wherein said pressure sensing section is mounted around an aperture of a tire for injecting air into the tire.

13. An air bag apparatus of in a tire pressure sensing system for a vehicle as claimed in claim 1, wherein said warning section comprises sound warning means.

14. An air bag apparatus in a tire air pressure sensing system for a vehicle as claimed in claim 13, wherein said sound warning means is a speaker.

15. An air bag apparatus in a tire air pressure sensing system for a vehicle as claimed in claim 13, wherein said sound warning means is a klaxon.

16. An air bag apparatus in a tire air pressure sensing system for a vehicle as claimed in claim 1, wherein said warning section comprises visual warning means.

17. An air bag apparatus of in a tire air pressure sensing system for a vehicle as claimed in claim 16, wherein said visual warning means is a display.

18. An air bag apparatus in a tire air pressure sensing system for a vehicle as claimed in claim 1, wherein said air bag actuating section comprises said air bag and an inflator for injecting an inflation gas into said air bag to inflate said air bag when receiving the air bag expansion triggering signal from said electronic control unit.

19. An air bag apparatus of in a tire air pressure sensing system for a vehicle, said air bag apparatus comprising:

a collision sensing section having first collision sensors for generating a first collision sensing signal when a shock applied to at least one of a front, rear, right side and left side portion of the vehicle exceeds a first shock value, and second collision sensors for generating a second collision sensing signal when a shock applied to at least one of the right side, left side and upper portion of the vehicle exceeds a second shock value;

a pressure sensing section mounted at at least one tire of the vehicle for generating a pressure sensing signal when the air pressure of vehicle tire is below a pressure value presented by a no-load state of an air pressure in the tire, said pressure sensing section having pressure sensors for monitoring the air pressure and radio transmitter means for amplifying the pressure sensing signal monitored by said pressure sensors to transmit the pressure sensing signal as a radio signal;

a receiving section for receiving the pressure sensing signal transmitted from said pressure sensing section as the radio signal;

an electronic control unit for generating an air bag expansion triggering signal either when receiving said first collision sensing signal or when receiving said second sensing signal from said second collision sensors and the pressure sensing signal from said receiving section, and for generating a warning operation start signal when receiving either the second collision sensing signal or the pressure sensing signal;

a warning section having sound warning means and visual warning means for alerting via a sound and visible characters in accordance with the warning operation start signal from said electronic control unit; and an air bag actuating section having said air bag and an inflator for injecting an inflation gas into said air bag to inflate said air bag when receiving said air bag expansion triggering signal from said electronic control unit.

20. An air bag apparatus in a tire air pressure sensing system for a vehicle, said air bag apparatus comprising:

a collision sensing section for generating a first collision sensing signal when a shock applied to at least one of the front, rear, right side and left side portion of the vehicle exceeds a first shock value, for generating a second collision sensing signal when a shock applied to at least one of the right side, left side and upper portion of the vehicle exceeds a second shock value, and the first shock value is greater than the second shock value, the first shock value having a minimum value required for inflating said air bag to protect passengers of the vehicle from a predetermined shock applied to the vehicle, the second shock value having the minimum value required for inflating said air bag to protect the passengers of the vehicle from the shock lower than the first shock value, said collision sensing section having first collision sensors for generating the first collision sensing signal and second collision sensors for generating the second collision sensing signal, said first collision sensors being mounted at at least one place among the front, rear, right side and left side portions of the vehicle, and said second collision sensors being mounted at the left side, right side and upper portions of the vehicle;

a pressure sensing section mounted around an aperture for injecting air into a tire of the vehicle for generating a pressure sensing signal when the air pressure of the vehicle tire is below a pressure value presented by a no-load state of an air pressure in the tire, and having pressure sensors for monitoring the air pressure and radio transmitter means for amplifying the pressure sensing signal monitored by said pressure sensors to transmit the pressure sensing signal as a radio signal;

a receiving section for receiving the pressure sensing signal transmitted from said pressure sensing section as the radio signal;

an electronic control unit for generating an air bag expansion triggering signal when receiving the first collision sensing signal, for generating the air bag expansion triggering signal when receiving the second sensing signal from said second collision sensors and the pressure sensing signal from said receiving section, and for generating a warning operation start signal when receiving either the second collision sensing signal or the pressure sensing signal;

a warning section having sound warning means and visual warning means, for alerting via a sound and visible characters in accordance with said warning operation start signal from said electronic control unit; and an air bag actuating section having said air bag and an inflator for injecting an inflation gas into said air bag to inflate said air bag when receiving said air bag expansion triggering signal from said electronic control unit.

* * * * *